(12) United States Patent
Huber

(10) Patent No.: US 10,750,363 B2
(45) Date of Patent: Aug. 18, 2020

(54) METHODS AND APPARATUSES FOR CONDITIONAL WIFI ROAMING

(71) Applicant: Telia Company AB, Solna (SE)

(72) Inventor: Michael Huber, Täby (SE)

(73) Assignee: Telia Company AB, Solna (SE)

(*) Notice: Subject to any disclaimer, the term of this patent is extended or adjusted under 35 U.S.C. 154(b) by 276 days.

(21) Appl. No.: 15/785,730

(22) Filed: Oct. 17, 2017

(65) Prior Publication Data
US 2018/0109948 A1    Apr. 19, 2018

(30) Foreign Application Priority Data
Oct. 18, 2016  (SE) ..................................... 1651364

(51) Int. Cl.
*G06F 13/00*   (2006.01)
*H04W 12/06*   (2009.01)
(Continued)

(52) U.S. Cl.
CPC .......... *H04W 12/06* (2013.01); *H04L 63/162* (2013.01); *H04L 67/16* (2013.01); *H04L 67/325* (2013.01);
(Continued)

(58) Field of Classification Search
CPC ..... H04L 67/16; H04L 67/325; H04L 63/162; H04L 67/303; H04W 8/082; H04W 48/20;
(Continued)

(56) References Cited

U.S. PATENT DOCUMENTS 8,590,023 B2 * 11/2013 Gupta ................... H04W 76/10
726/5
9,084,081 B2 *  7/2015 Gupta ................... H04W 76/10
(Continued)

FOREIGN PATENT DOCUMENTS

WO    2004034650 A2    4/2004
WO    2012024204 A2    2/2012
(Continued)

OTHER PUBLICATIONS

Swedish Search Report dated Apr. 5, 2017, for Swedish Patent Application No. 1651364-0, filed Oct. 18, 2016 consisting of 2-pages.
(Continued)

*Primary Examiner* — Kenneth R Coulter
(74) *Attorney, Agent, or Firm* — Kilpatrick Townsend & Stockton LLP

(57) ABSTRACT

The embodiments herein relate to a mobile terminal and a method for accessing a wireless network in a roaming environment, the mobile terminal being pre-provided with credentials to access the wireless network, the mobile terminal further being provided with an application, said application includes a service part and an application part. The mobile terminal is configured to: send a request to a EAP server, the request including the credentials of the mobile terminal; connect the service part of the application to an access control server which adds/creates an EAP account for the mobile terminal for a predetermined time period; and to access the wireless network when the EAP server validly authenticates the credentials of the mobile terminal. The embodiments also relate to a method in the access control server and to the server.

10 Claims, 5 Drawing Sheets

(51) Int. Cl.
*H04W 48/20* (2009.01)
*H04L 29/06* (2006.01)
*H04W 84/12* (2009.01)
*H04L 29/08* (2006.01)
*H04W 8/08* (2009.01)
*H04W 48/18* (2009.01)
*H04W 76/10* (2018.01)

(52) U.S. Cl.
CPC ........... *H04W 8/082* (2013.01); *H04W 48/20* (2013.01); *H04W 84/12* (2013.01); *H04L 67/303* (2013.01); *H04W 48/18* (2013.01); *H04W 76/10* (2018.02)

(58) Field of Classification Search
CPC ..... H04W 84/12; H04W 12/06; H04W 76/10; H04W 48/18
USPC ........... 709/227–229, 225, 217–219; 726/21, 726/26–29, 4, 17–20
See application file for complete search history.

(56) References Cited

U.S. PATENT DOCUMENTS

| | | | |
|---|---|---|---|
| 9,237,448 B2* | 1/2016 | Choyi | ................ H04L 63/08 |
| 9,743,280 B2* | 8/2017 | Choyi | ................ H04L 63/08 |
| 9,906,940 B2* | 2/2018 | Gupta | ................ H04W 76/10 |
| 9,980,213 B2* | 5/2018 | Lynch | ................ H04W 48/08 |
| 10,349,263 B2* | 7/2019 | Gupta | |
| 2009/0052393 A1 | 2/2009 | Sood et al. | |
| 2013/0007853 A1* | 1/2013 | Gupta | ................ H04W 76/10 726/5 |
| 2014/0050320 A1* | 2/2014 | Choyi | ................ H04L 63/08 380/270 |
| 2016/0057691 A1 | 2/2016 | Burton et al. | |
| 2016/0142915 A1* | 5/2016 | Choyi | ................ H04L 63/08 726/4 |
| 2016/0212695 A1* | 7/2016 | Lynch | ................ H04W 48/08 |

FOREIGN PATENT DOCUMENTS

| | | |
|---|---|---|
| WO | 2013/151752 A1 | 10/2013 |
| WO | 2016/147825 A1 | 10/2015 |

OTHER PUBLICATIONS

European Application No. 17195127.0, Extended European Search Report dated Nov. 20, 2017, 9 pages.

* cited by examiner

METHODS AND APPARATUSES FOR CONDITIONAL WIFI ROAMING

CROSS-REFERENCE TO RELATED APPLICATION

This Application is related to and claims priority to Swedish Patent Application No. 1651364-0, filed Oct. 18, 2016, the entirety of which is incorporated herein by reference.

TECHNICAL FIELD

The present disclosure relates to the field of wireless communications, and in particular to methods and apparatuses for providing access to a wireless network in a roaming environment.

BACKGROUND

With the advent of Internet access mobile communications technology, so also has evolved the presence of WiFi Internet access locations (i.e., hotspots provided by a network operator) where an Internet access mobile terminal may gain access to an Internet connection and Internet content. Such WiFi Internet access locations may comprise locations including but not limited to commercial services locations (i.e., restaurants, hotels and other retail sales establishments), public services locations (i.e., airports, other transportation terminals, libraries and government offices) and private locations (i.e., residences). These hotspots are also referred to as Open WiFi networks.

While ready mobile access to Internet service and Internet content is desirable within the context of the information technology art, ready mobile access to Internet service and Internet content is nonetheless not entirely without problems within the information technology art. In that regard, WiFi hotspots of an operator available to mobile terminals need to be managed by the operator in a way that is seamless to the mobile terminals especially when mobile terminals roam in a network comprising such WiFi hotspots. The greater the number of hotspots the more difficult it is for an operator to manage such a network.

Thus, desirable are apparatuses, methods and program product that provide for seamless connectivity within the context of mobile connectivity to a plurality of WiFi hotspots in a roaming environment, in such a way as to facilitate for the operator control of the access to the network as well as to facilitate for the mobile terminal access to the network.

SUMMARY

It is an object of embodiments herein to solve the above problems by providing a mobile terminal and a method thereof; a method for providing a mobile terminal access to a wireless network in a roaming environment, an access control server and a method thereof.

According to an aspect of embodiments herein, there is provided a method performed by a mobile terminal for accessing a wireless network in a roaming environment, the mobile terminal being pre-provided with credentials to access the wireless network and further provided with an application that includes an application part and a service part. The mobile terminal comprising a processor and a memory, said memory containing instructions executable by the processor wherein the mobile terminal is operative to: send, via an access point, a request to an Extensible Authentication Protocol (EAP) server, the request including the credentials of the mobile terminal; connect the service part of the application to an access control server which adds/creates and EAP account for the mobile terminal for a predetermined time period; the access control server being connected to the EAP server; and the mobile terminal is operative to access the wireless network when the EAP server validly authenticates the credentials of the mobile terminal.

According to another aspect of embodiments herein, there is provided a method performed by a mobile terminal for accessing a wireless network in a roaming environment, the mobile terminal being pre-provided with credentials to access the wireless network and further provided with an application that includes an application part and a service part; the method comprising: sending, via an access point, a request to a EAP server, the request including the credentials of the mobile terminal; connecting the service part of the application to a access control server which adds/creates an EAP account for the mobile terminal for a predetermined time period; the access control server being connected to the EAP server; and accessing the wireless network when the EAP server validly authenticates the credentials of the mobile terminal.

According to another aspect of embodiments herein, there is provided a method for providing a mobile terminal access to a wireless network in a roaming environment, the network comprising an access point, a EAP server and an access control server. The mobile terminal being pre-provided with credentials to access the network, and further being provided with an application comprising a service part and an application part. The method comprising: the mobile terminal sending via an access point, a request to the EAP server, the request including the credentials of the mobile terminal. The method further comprising, connecting the service part of the application to an access control server which adds/creates an EAP account for the mobile terminal for a predetermined time period. The access control server being connected to the EAP server. The method further comprising, the mobile terminal accessing the wireless network when the EAP server validly authenticates the credentials of the mobile terminal.

According to yet another aspect of embodiments herein, there is provided an access control server for enabling a mobile terminal, accessing a wireless network, to maintain an application of the mobile terminal active, the application comprising an application part and a service part. The access control server being connected to an EAP a server. The access control server being configured to: connect to the service part of the application; add/create an EAP account for the mobile terminal, and maintain the EAP account active for a predetermined time period.

According to yet another aspect of embodiments herein, there is provided a method performed by an access control server for maintaining an application of a mobile terminal accessing a wireless network in a roaming environment active; the application comprising an application part and a service part. The access control server being connected to an EAP server. The method comprising: connecting to the service part of the application; creating/adding an EAP account for the mobile terminal and maintaining the EAP account active for a predetermined time period.

There is also provided a computer program comprising instructions which when executed on at least one processor of the mobile terminal according to embodiments herein, cause the at least one processor to carry out the method of the method describe above. Also, a carrier containing the computer program of is provided, wherein the carrier is one of a computer readable storage medium; an electronic signal, optical signal or a radio signal.

An advantage of adding an EAP account that expires after a predetermined time period which is controlled by the operator, is to make sure that the mobile terminal has the application up running to be able to access the "Free WiFi" of the operator. This is advantageous in a roaming environment wherein a plurality of WiFi networks are available. Maintaining the application up running as explained above may be viewed as conditional WiFi roaming which is controlled by the operator.

BRIEF DESCRIPTION OF THE DRAWINGS

Examples of embodiments herein are described in more detail with reference to attached drawings in which.

DETAILED DESCRIPTION

In the following, a detailed description of the exemplary embodiments is described in conjunction with the drawings, in several scenarios to enable easier understanding of the solution(s) described herein.

The Extensible Authentication Protocol (EAP) is a protocol for wireless networks that expands on authentication methods used by Point-to-Point Protocol (PPP), a protocol often used when connecting a computer to the Internet. EAP may support multiple authentication mechanisms, such as token cards, smart cards, certificates, one-time passwords, and public key encryption authentication. EAP also runs directly over data link layer such as IEEE 802 (WiFi). As known, a Subscriber Identity Module (SIM) card is used to carry out user or subscriber authentication. For example EAP SIM uses a SIM authentication algorithm between a client/subscriber and an authentication server e.g. an Authentication, Authorization and Accounting (AAA) server or an EAP-server providing mutual authentication between the client/subscriber and the network.

The EAP SIM protocol gives an operator control to handle roaming subscribers in a controlled manner.

Figure 1:
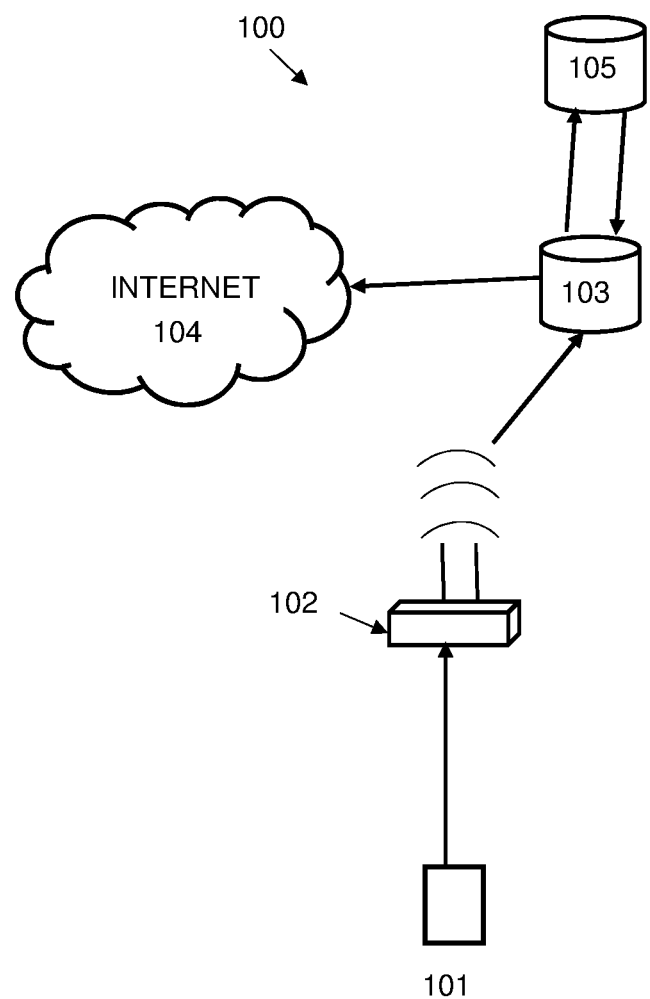
FIG. 1 illustrates how EAP sim is used for accessing internet in a WiFi hotspot environment according to prior art.

Referring to FIG. 1 there is illustrated how EAP SIM is used for accessing internet in a WiFi hotspot environment 100 according to prior art.

The figure shows a mobile terminal 101 of a user/subscriber (not shown); a gateway or access point 102; a router 103 connected to the Internet 104, and a EAP server 105.

The user's mobile terminal 101 is typically provided with a certificate or a username and a password for authentication purposes. In communications using EAP, the user requests, by means of the mobile terminal 101, connection or access to a wireless network through the access point or gateway 102. The access point 102 requests identification data or credentials from the user's mobile terminal 101 and transmits that data or credentials to the EAP server 105 via router 103. The EAP server 105 requests the access point 102 for proof of the validity of the user's credentials. After the access point 102 obtains that verification from the user's mobile terminal 101 and sends it back to the EAP server 104, the user is connected to the network, as requested, provided the credentials are determined to be valid by the EAP server 105.

In a scenario where the number of WiFi hotspots is very large, e.g. millions, the managing by the operator of authentication data of subscribers may become cumbersome. This would be the case where several operators sharing the hotspots and subscribers or users are roaming in such an environment. In order to facilitate control for an operator in such a roaming environment, below is described a solution 200 in relation to FIG. 2A.

According to embodiments herein a mobile terminal 201 is provided with an application software 206 that comprises an application part 206A and a service part 206B. For example, the user of the mobile terminal 201 may download such an operator specific application 206 to enable the user to access the "free WiFi" of the operator in a roaming environment. The application software 206 may also be pre-installed in the mobile terminal 201. The mobile terminal 201 is pre-provided with credentials (e.g. a user name and a password) to access the wireless network ("free WiFi"). In operation and as shown, the mobile terminal 201 having e.g. user_id=123 try to access the open EAP WiFi network of the operator by sending, via an access point 202, a request to the EAP server 205. The request includes the credentials of the mobile terminal 201. The request is shown here transmitted from the access point 202 to the router 203 before it reaches the EAP server 205. This operation is similar to the one previously described in relation to FIG. 1.

According to embodiments herein the service part 206B of the application 206 of the mobile terminal 201 is configured to connect to an access control server 207 which is controlled by the operator of the network. This access control server 207 is configured to add or create an EAP account for the mobile terminal 201 for a predetermined time period. Hence, the access control server 207 keeps the created/added EAP account of user_id=123 alive for a predefined time period. The access control server 207 is also shown connected to the EAP server 205. As shown, the time period of the EAP account of user_id=123 may be refreshed. The access control server 207 informs the EAP server 205 of this refresh so that the EAP server 205 maintains access of the mobile terminal 201 alive. When the EAP server 205 validates the credentials, the mobile terminal 201 is allowed to access the wireless EAP network or the Internet 205.

An advantage of adding an EAP account that expires after a predetermined time period which is controlled by the operator, is to make sure that the mobile terminal 201 has the application up running to be able to access the "Free WiFi" of the operator. This is advantageous in a roaming environment wherein a plurality of WiFi access points or networks are deployed. Maintaining the application up running as explained above may be viewed as conditional WiFi roaming which is controlled by the operator.

The length of the time period which is configurable by the operator may vary from e.g. 5-10 minutes depending on activity of the user. Note however that the length of this time period of 5-10 minutes is only an example.

Figure 2A:
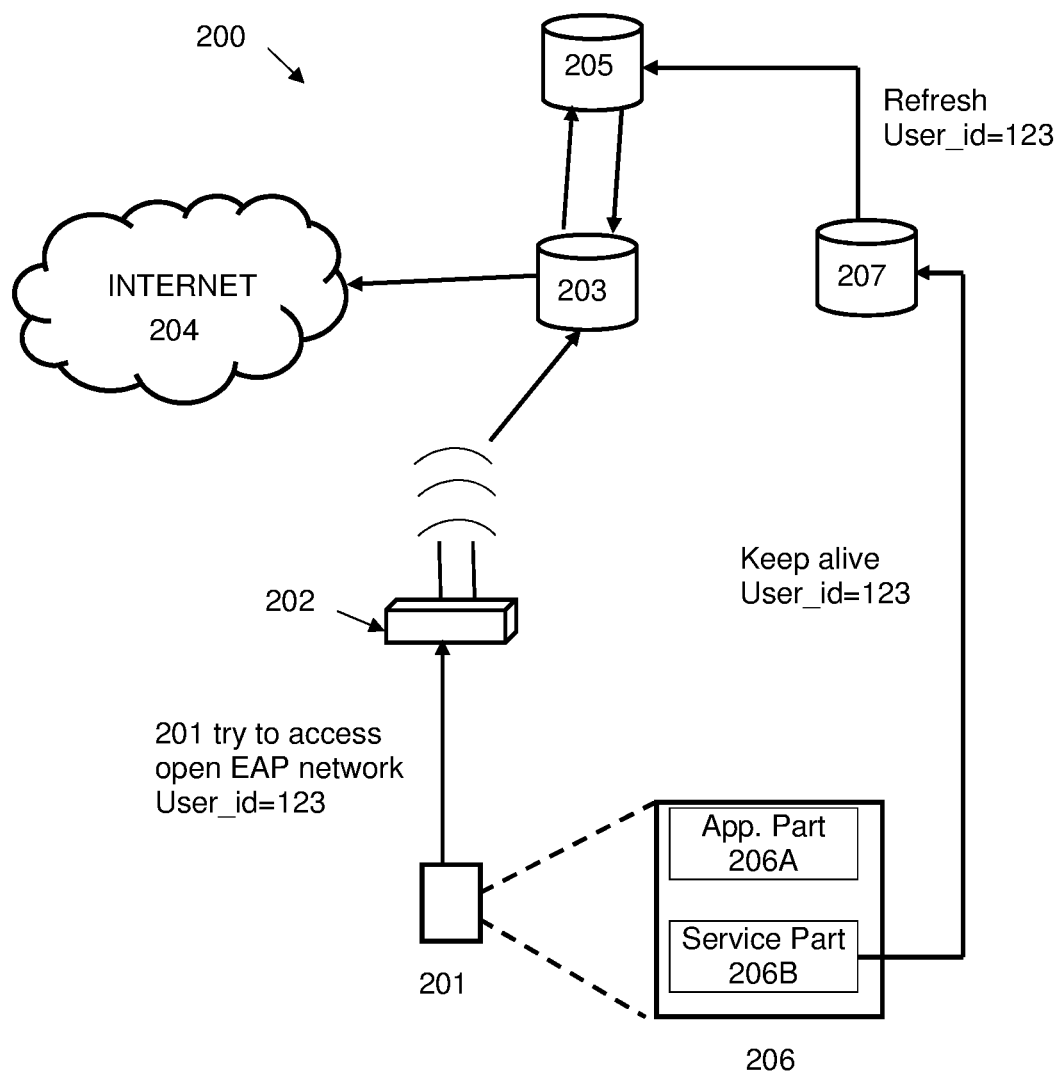
FIG. 2A illustrates how EAP sim is used for accessing internet in a WiFi hotspot environment according to exemplary embodiments herein.

Since the solution described above may be used in a roaming environment where mobile terminals may have access to several open WiFi networks, it is important to further increase security. One way to achieve this is to add an extra server in order to verify that the service part 206B of the application 206 is actually running. Such extra server may be an integral part of the access control server 207 or may be a separate server. This server may be called an active access control server denoted 208 in FIG. 2B. The active access control server 208 is here shown connected to the access control server 207 as well as to the router 203. The only difference between FIG. 2A and FIG. 2B is the addition of the active access control server 208.

Figure 2B:
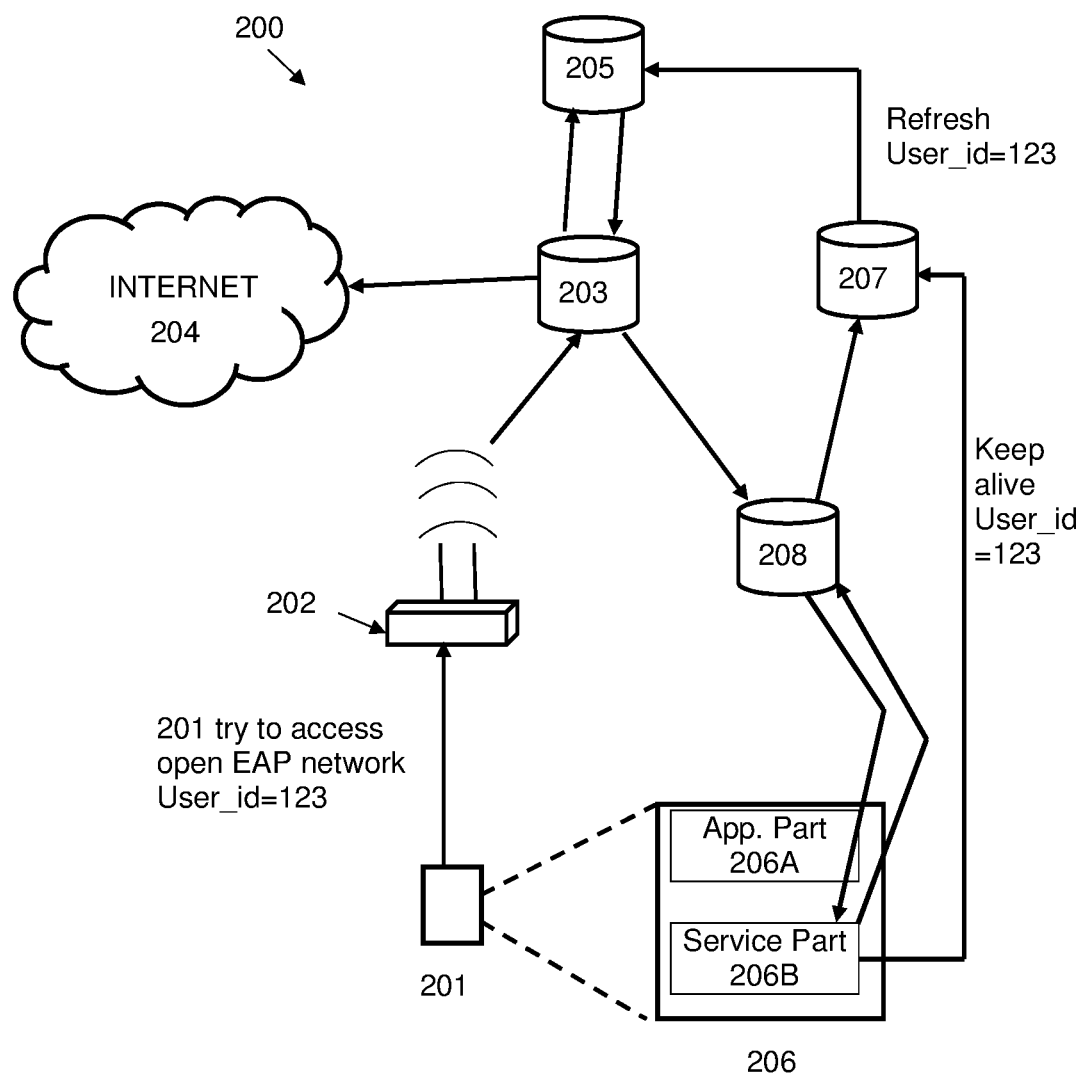
FIG. 2B illustrates how EAP sim is used for accessing internet in a WiFi hotspot environment according to an exemplary embodiment herein.

As depicted in FIG. 2B, the active access control server 208 is configured to send a query to the service part 206B of the application 206, querying the service part 206B whether the service part is active or running. In the event the service part 206B responds in the negative i.e. that the service part 206B is not active, the active access control server 208 notifies the access control server 207 which in turn notifies the EAP server 205. In this case, the connection is terminated for the mobile terminal 201, and the added EAP account is released or deleted.

It should me mentioned that since the operator of the network knows what access point or gateway a user is connected to in a roaming environment, the operator may advertise services or offerings to users or subscribers. For example, when a subscriber enters a shop, the application of the mobile terminal of the user may receive a notification of today's offerings while the service part of the application is still active. Such notifications may instead be transmitted via SMS or MMS. The predetermined time period of the EAP account for the mobile terminal may therefore be adapted depending on the location of the user.

Figure 3:
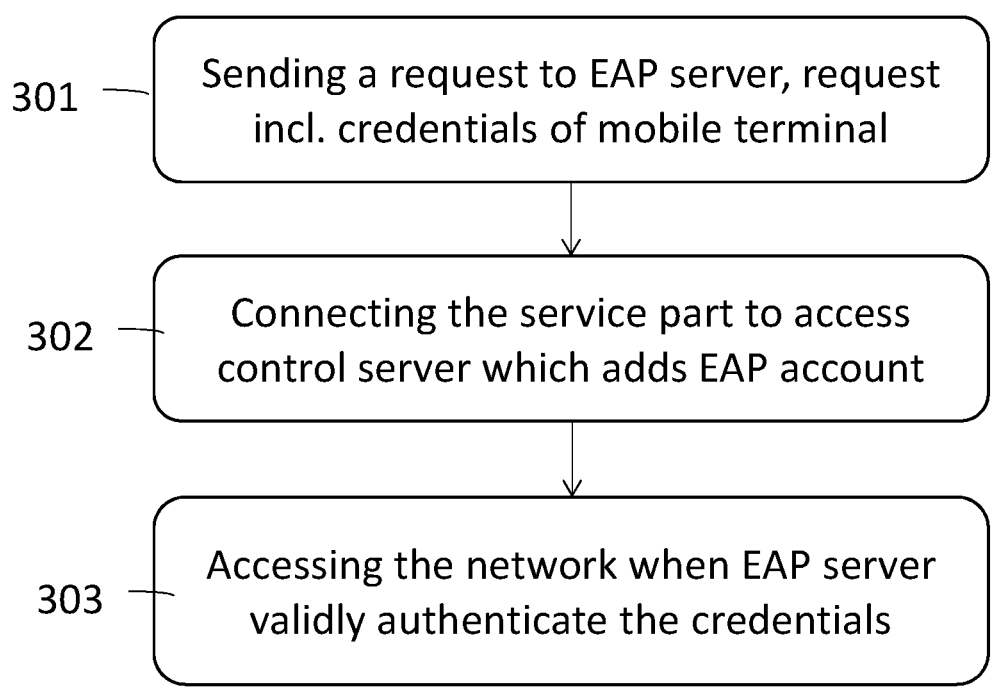
FIG. 3 illustrates a flowchart of a method performed by a mobile terminal according to an exemplary embodiment.

Referring to FIG. 3 there is illustrated a flowchart summarizing the main actions of a method performed by a mobile terminal in accordance with previously described embodiments. The mobile terminal being pre-provided with credentials to access the wireless network, the mobile terminal further being provided with an application which includes a service part and an application part. The method comprising:

(301) sending, via an access point, a request to a EAP server, the request including credentials of the mobile terminal;

(302) connecting the service part of the application to an access control server which adds/creates an EAP account for the mobile terminal for a predetermined time period; and (303) accessing the wireless network when the EAP server validly authenticates the credentials of the mobile terminal.

The method further comprises, receiving, at the service part of the mobile terminal, a query from an active access control server, querying the service part of the application whether it is active or not.

Figure 4:
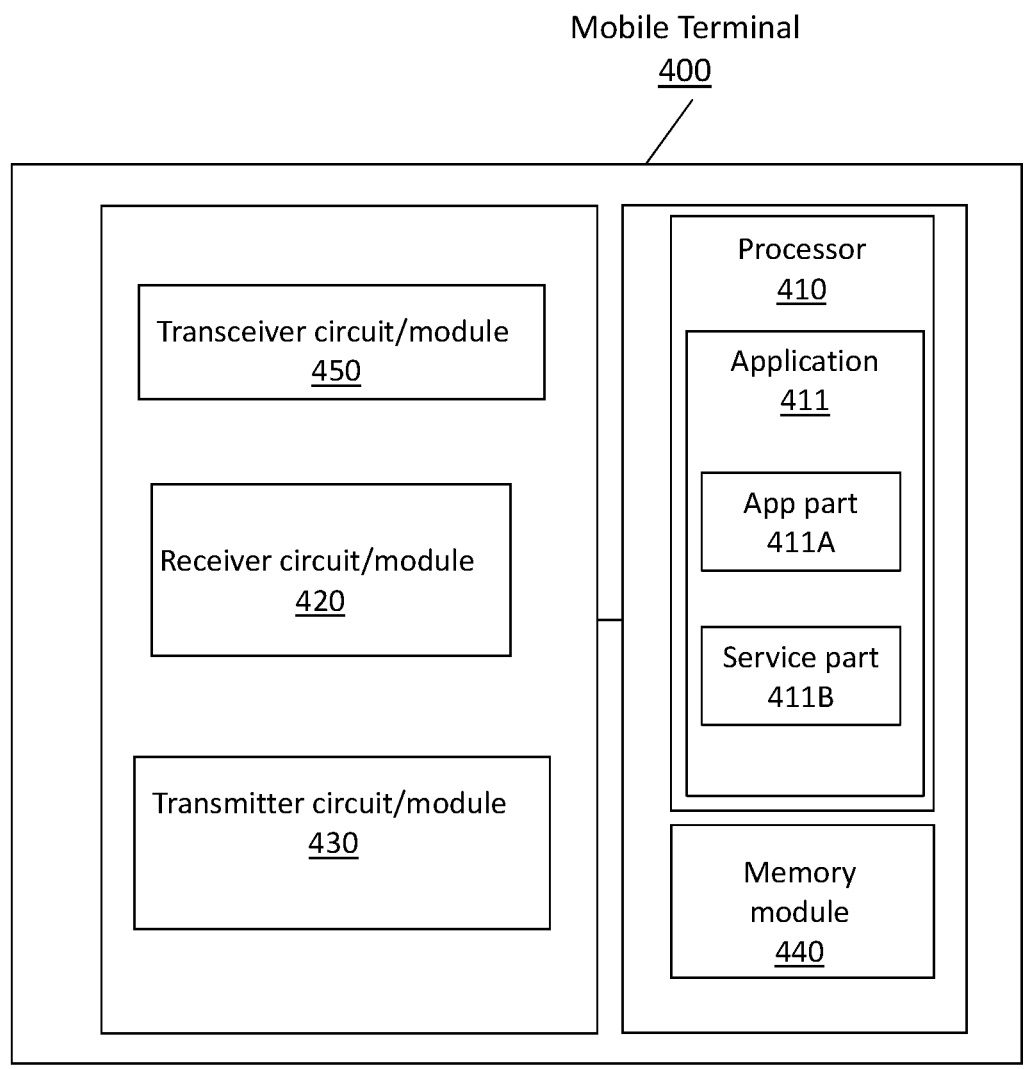
FIG. 4 is a block diagram depicting a mobile terminal according to embodiments herein.

To perform the method or procedure steps/actions described above, a mobile terminal 400 is provided as depicted in FIG. 4.

The mobile terminal 400 comprises a processing circuit or a processing module or a processor or means 410, antenna circuitry (not shown); a receiver circuit or receiver module 420; a transmitter circuit or transmitter circuit 430; a memory module 440 and a transceiver circuit or transceiver module 450 which may include the transmitter circuit 430 and the receiver circuit 420.

The mobile terminal may be a wireless device, a wireless terminal, a mobile station, a mobile telephone, a cellular telephone, or a smart phone. Further examples of different wireless devices comprise laptops with wireless capability, Laptop Embedded Equipment (LEE), Laptop Mounted Equipment (LME), USB dongles, Customer Premises Equipment (CPE), modems, Personal Digital Assistants (PDA), or tablet computers, sometimes referred to as a surf plates with wireless capability or simply, tablets, just to mention some examples.

The processing module/circuit 410 includes a processor, microprocessor, an application specific integrated circuit (ASIC), field programmable gate array (FPGA), or the like, and may be referred to as the "processor 410." The processor 410 controls the operation of the mobile terminal 400 and its components. Memory (circuit or module) 440 includes a random access memory (RAM), a read only memory (ROM), and/or another type of memory to store data and instructions that may be used by processor 410. In general, it will be understood that the mobile terminal 400 in one or more embodiments includes fixed or programmed circuitry that is configured to carry out the operations in any of the embodiments disclosed herein.

In at least one such example, the mobile terminal 400 includes a microprocessor, microcontroller, DSP, ASIC, FPGA, or other processing circuitry that is configured to execute computer program instructions from a computer program stored in a non-transitory computer-readable medium that is in, or is accessible to the processing circuitry. Here, "non-transitory" does not necessarily mean permanent or unchanging storage, and may include storage in working or volatile memory, but the term does connote storage of at least some persistence. The execution of the program instructions specially adapts or configures the processing circuitry to carry out the mobile terminal operations disclosed herein. Further, it will be appreciated that the mobile terminal 400 may comprise additional components not shown in FIG. 4.

The receiver module/circuit 420 (also referred to as a receiver 420 or receiver circuit 420) or the transceiver module/circuit 450 (also referred to as a transmitter 450 or transmitter circuit 450) is configured to send, via an access point, a request to a EAP server, the request including credentials of the mobile terminal. The mobile terminal 400 is provided with an application software that is controlled by the processor 410. In the Figure, the application 411 is shown comprising of two parts, an application part 411A and a service part 411B. The application 411 maybe pre-stored in the memory of the mobile terminal 410 or it can be downloaded from e.g. Internet and stored in the memory of the mobile terminal 410. The mobile terminal 400, by means of the processor 410 is operative to connect the service part 411B of the application 411 to an access control server which adds/creates an EAP account for the mobile terminal for a predetermined time period; and when the EAP server validly authenticates the credentials of the mobile terminal 400, the mobile terminal 400 may access the wireless network of the operator.

As previously described there is also provided an access control server for maintaining an application of a mobile terminal accessing a wireless network in a roaming environment active; the application comprising an application part and a service part; the access control server is configured to: connect to the service part of the application; create or add an EAP account for the mobile terminal; and maintain the EAP account active for a predetermined time period.

Further, it is provided a method performed by an access control server for maintaining an application of a mobile terminal accessing a wireless network in a roaming environment active; the application comprising an application part and a service part. The method comprising: connecting the service part of the application of the mobile terminal; creating or adding an EAP account for the mobile terminal and maintaining the EAP account active for a predetermined time period which is controlled by the network operator.

There is also provided a computer program comprising instructions which when executed on at least one processor of the mobile terminal according to embodiments herein, cause the at least one processor to carry out the method describe above. Also, a carrier containing the computer program is provided, wherein the carrier is one of a computer readable storage medium; an electronic signal, optical signal or a radio signal.

It should be mentioned that the original EAP account that is used to access the network is maintained normally at the EAP server since embodiments herein are used in a roaming environment. Hence, the creation of a new EAP account by the access control server is instead used to maintain the application of the mobile terminal up running or active for the (WiFi) roaming to work, for a predetermined time period.

Throughout this disclosure, the word "comprise" or "comprising" has been used in a non-limiting sense, i.e. meaning "consist at least of". Although specific terms may be employed herein, they are used in a generic and descriptive sense only and not for purposes of limitation. In particular, it should be noted that although terminology from WiFi has been used in this disclosure to exemplify the invention, this should not be seen as limiting the scope of the invention to only the aforementioned system. Other wireless systems, including LTE-A (or LTE-Advanced), 5G, UMTS and WiMax may also benefit from exploiting the ideas covered within this disclosure.

The invention claimed is:

1. A mobile terminal for accessing a wireless network in a roaming environment, the mobile terminal being pre-provided with credentials to access the wireless network, the mobile terminal further being provided with an application, said application including a service part and an application part, the mobile terminal comprising a processor and a memory, said memory containing instructions executable by the processor wherein the mobile terminal is configured to:
send, via an access point, a request to an Extensible Authentication Protocol (EAP) server, the request including the credentials of the mobile terminal;
connect the service part of the application to an access control server which adds an EAP account for the mobile terminal for a predetermined time period, the access control server being connected to said EAP server;
access the wireless network when the EAP server validly authenticates the credentials of the mobile terminal; and
transmit information to the access control server, wherein the access control server informs the EAP server of a refresh of the predetermined time period, and the EAP server maintains access of the mobile terminal during the refreshed predetermined time period.

2. The mobile terminal according to claim 1, further configured to receive a query from an active access control server connected to the access control server and to a router, querying the service part of the application whether the service part is active or not.

3. The mobile terminal according to claim 2 wherein, in response to the service part being inactive:
the mobile terminal is further configured to send, to the active access control server, a negative response to the query;
the active access control server notifies the access control server of the negative response to the query;
the access control server notifies the EAP server of the negative response to the query; and
the EAP server terminates the access of the mobile terminal and releases or deletes the added EAP account.

4. A method performed by a mobile terminal for accessing a wireless network in a roaming environment, the mobile terminal being pre-provided with credentials to access the wireless network, the mobile terminal further being provided with an application, said application includes a service part and an application part, the method comprising:
sending, via an access point, a request to an Extensible Authentication Protocol (EAP) server, the request including the credentials of the mobile terminal;
connecting the service part of the application to an access control server which adds an EAP account for the mobile terminal for a predetermined time period, the access control server being connected to said EAP server; and
accessing the wireless network when the EAP server validly authenticates the credentials of the mobile terminal.

5. The method according to claim 4, further comprising receiving, at the service part of the application, a query from an active access control server, querying the service part of the application whether the service part is active or not.

6. A method for providing a mobile terminal access to a wireless network in a roaming environment, the wireless network comprising an access point, an Extensible Authentication Protocol (EAP) server, and an access control server, the mobile terminal being pre-provided with credentials to access the wireless network, the mobile terminal further being provided with an application, said application includes a service part and an application part, the method comprising:
the mobile terminal sending, via the access point, a request to the EAP server, the request including the credentials of the mobile terminal;
the service part of the application connecting to the access control server which adds an EAP account for the mobile terminal for a predetermined time period, the access control server being connected to said EAP server;
the mobile terminal accessing the wireless network when the EAP server validly authenticates the credentials of the mobile terminal; and
the mobile terminal transmitting information to the access control server, wherein the access control server informs the EAP server of a refresh of the predetermined time period, and the EAP server maintains access of the mobile terminal during the refreshed predetermined time period.

7. The method according to claim 6, further comprising transmitting from an active access control server a query to the service part of the application of the mobile terminal, querying the service part whether the service part is active or not.

8. The method according to claim 7, further comprising terminating the connection to the service part if the service part is inactive.

9. An access control server for maintaining an application of a mobile terminal accessing a wireless network in a roaming environment to be active, the application comprising an application part and a service part, the access control server being connected to an Extensible Authentication Protocol (EAP) server, the access control server being configured to:
- connect to the service part of the application;
- create or add an EAP account for the mobile terminal for a predetermined time period;
- authenticate credentials of the mobile terminal from the EAP server so that the mobile terminal may access the wireless network;
- receive information from the mobile terminal for refresh of the predetermined time period; and
- inform the EAP server of the refresh of the predetermined time period, wherein the EAP server maintains wireless network access of the mobile terminal during the refreshed predetermined time period.

10. A method performed by an access control server for maintaining an application of a mobile terminal accessing a wireless network in a roaming environment to be active, the application comprising an application part and a service part; the access control server being connected to an Extensible Authentication Protocol (EAP) server, the method comprising:
- connecting to the service part of the application;
- creating or adding an EAP account for the mobile terminal for a predetermined time period;
- authenticating credentials of the mobile terminal from the EAP server so that the mobile terminal may access the wireless network;
- receiving information from the mobile terminal for a refresh of the predetermined time period; and
- inform the EAP server of the refresh of the predetermined time period, wherein the EAP server maintains wireless network access of the mobile terminal during the refreshed predetermined time period.

* * * * *